455/12

[redacted]

Bernasconi et al.

[11] 3,761,814

[45] Sept. 25, 1973

[54] TELECOMMUNICATION SYSTEM WITH TRANSMITTING STATIONS SELECTIVELY OPERABLE AS TEMPORARY REFERENCE STATIONS

[75] Inventors: Gabriele Bernasconi, Luisago; Isidoro Poretti, Castiglione Olana, both of Italy

[73] Assignee: Societa Italiana Telecommunicazioni Siemens S.p.A., Milano, Italy

[22] Filed: Dec. 15, 1971

[21] Appl. No.: 208,336

[30] Foreign Application Priority Data

Dec. 17, 1970 Italy .......................... 333133 A/70

[52] U.S. Cl. .............. 325/4, 179/15 BS, 179/15 BA

[51] Int. Cl. .............................................. H04b 7/14

[58] Field of Search ................ 325/4, 2; 179/15 BA, 179/15 BS

[56] References Cited

UNITED STATES PATENTS 3,683,116 8/1972 Dill ........................................ 325/4

*Primary Examiner*—Robert L. Griffin
*Assistant Examiner*—William T. Ellis
*Attorney*—Karl F. Ross

[57] ABSTRACT

A time-division-multiplex telecommunication system, with a multiplicity of ground stations communicating with one another via satellite, allocates to each ground station one or more subframes in a series of such subframes following one another in cyclic succession to constitute a sequence of signal frames. The first subframe of each frame, designated the reference subframe, serves for the transmission of frame-synchronizing signals from one of the stations of the system operating as a reference station, the latter sending out its address together with the frame-synchronizing code. In every other station, a counter triggered by an incoming frame-synchronizing code determines from that address the subframe allocated to the reference station and, in the one station using the next-following active subframe, generates an internal signal designating that station as a standby station to serve as a reference station if the actual reference station drops out. The standby condition is terminated upon reception of the next frame-synchronizing code but, in the absence of a predetermined number of such codes in successive frames, is converted into a reference condition whereby the affected station takes over the transmission of frame-synchronizing pulses.

9 Claims, 6 Drawing Figures

TELECOMMUNICATION SYSTEM WITH TRANSMITTING STATIONS SELECTIVELY OPERABLE AS TEMPORARY REFERENCE STATIONS

Our present invention relates to a telecommunication system of the time-division-multiplex (TDM) type in which a multiplicity of stations communicate with one another by transmitting and receiving message signals (hereinafter referred to as "data") in different subdivisions or subframes of a recurrent time period referred to as a frame. Such a system is typically utilized for communication among ground stations via satellite, each ground station having one or more subframes individually allocated to it for purposes of data transmission.

In order to correlate the operations of the several ground stations in this type of system, one station periodically broadcasts frame-synchronizing signals which are picked up by all other stations to establish the first subframe of a predetermined series of subframes constituting a frame. Starting from this first or reference subframe, a suitable timing circuit at each station establishes the subframe or subframes allocated to that station for data transmission.

If, for any reason, the reference station emitting the frame-synchronizing signals drops out or fails to generate these signals for an extended period, confusion may result from the unavoidable divergence of the timing operations at the several stations. Thus, the general object of our present invention is to provide, in such a system, a method of and means for activating another affiliated station to serve as a reference station upon recurrent failure of the original synchronizing signal.

A more specific object of this invention is to provide means for establishing a predetermined sequence in which any active station of the system, i.e., any station engaged in data transmission, may operate as a reference station upon failure of the immediately preceding station in that sequence to transmit frame-synchronizing signals.

These objects are realized, in accordance with our present invention, by equipping each station with first and second signal-generating means adapted to produce frame-synchronizing signals and subframe-synchronizing signals, respectively, the latter signals being identical for all stations but distinct from the universal frame-synchronizing signals. The first signal-generating means, when operatively connected to a transceiver during a reference subframe, also emits an address code identifying the corresponding station whenever the same serves as a reference station. The second signal-generating means, operatively connected to the transceiver during the allocated subframe, also supplies the data to be transmitted from that station. As long as frame-synchronizing signals are regularly received from a properly operating reference station, a station engaged only in data transmission temporarily stores the identity of the reference station on an address register which determines therefrom the subframe allocated to the reference station (or, if several subframes are so allocated, a particular one of those such as, for example, the first one) and delivers that information to a comparator also receiving the count of the subframes within the current frame from the timing circuit. As soon as this count matches the numerical information provided by the address register, a programmer controlled by the comparator establishes a waiting phase terminated upon the occurrence of the next subframe-synchronizing signal. If that synchronizing signal originates at another station, the station here considered immediately returns to normal; if it is this station's own signal, i.e., if the subframe (or the first of several subframes) allocated to this station is the first active subframe following the one assigned to the current reference station, the station considered is placed in a standby condition which is canceled only upon the occurrence of the next frame-synchronizing signal and which therefore endures to at least the end of the frame then in progress. If the hitherto operative reference station discontinues the transmission of frame-synchronizing signals, a monitoring circuit at each active affiliated station delivers to the programmer a failure signal which, in the one station then in standby condition, converts this condition into a reference condition by initiating the periodic emission of frame-synchronizing signals from that station together with the corresponding address code.

The above and other features of our invention will be described in detail hereinafter with reference to the accompanying drawing in which.

Figure 1:
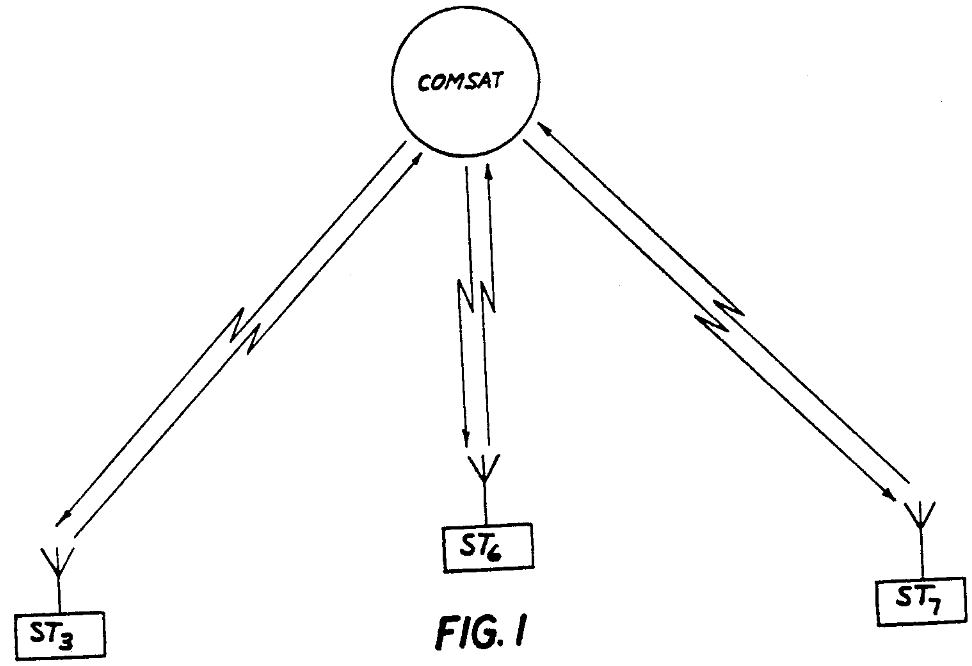
FIG. 1 is an overall view of a satellite communication system to which the present invention is applicable.

In FIG. 1 we have shown three ground stations $ST_3$, $ST_6$, $ST_7$ which, together with other stations not shown, exchange data via a communication satellite (COMSAT). It is assumed that there are *n* such stations and that each of these stations has allocated to it at least one data subframe in a frame consisting of a reference subframe $sf_r$ and *n* data subframes $sf_1 - sf_n$ as illustrated in graph (I) of FIG. 5 and graph (*a*) of FIG. 6.

Each station, when active, transmits data in the form of binary code words during its assigned subframe and may receive data from other stations in the corresponding subframes. One of them, e.g., station $ST_3$, operates temporarily as a reference station by periodically transmitting a similarly coded frame-sync signal $S_f$, FIG. 5(III), to establish a reference subframe $sf_r$ as the first subdivision of a frame of duration T. The reference subframe $sf_r$, whose length $T_1$ is somewhat less than the length $T_2$ of any data subframe $sf_1 - sf_n$, also comprises a synchronizing signal $S_m$ for the modulator-demodulator (MODEM) of each station and a carrier-recovery signal $R_c$ as well as an address code $S_a$. The adress address may simply be the binary word giving the numerical value of the subscript of the data subframe (or the first of several data subframes) allocated to the respective station; thus, with reference station $ST_3$ transmitting data in subframe $sf_3$, its address may be the binary word 0011. This relationship, however, is not essential since any distinctive address code may be correlated with the time position of the assigned data subframe by a suitable conversion matrix at each station.

Figure 5:
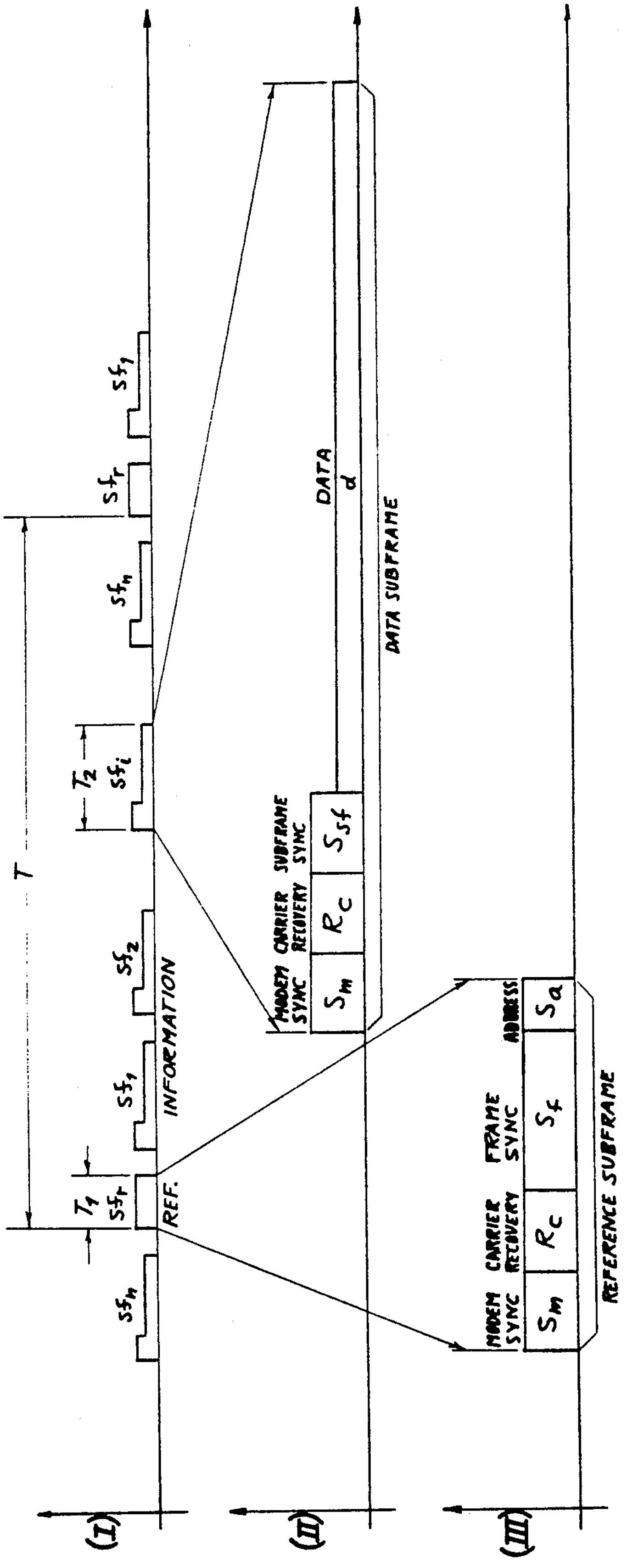
FIG. 5 is a set of graphs showing the composition of a signal frame utilized in the system.

As shown in FIG. 5(II), a representative data subframe $sf_i$ is composed of a MODEM-sync signal $S_m$, a carrier-recovery signal $R_c$ and a subframe-sync signal $S_{sf}$, followed by a data word *d*.

Figure 2:
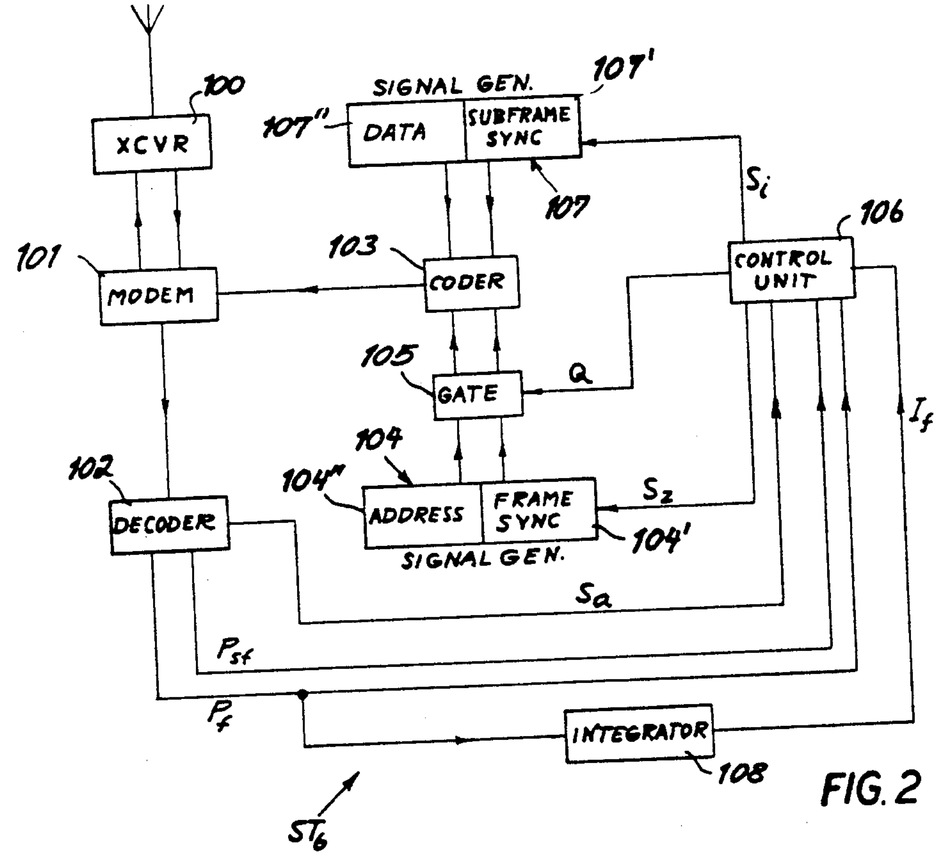
FIG. 2 is a block diagram of one of the stations of the system shown in FIG. 1.

Reference will now be made to FIG. 2 which shows the layout of station $ST_6$ representative of that of any ground station affiliated with the system. The station comprises a transceiver 100 connected to a MODEM 101 which feeds a decoder 102 and is supplied from a coder 103. A first signal generator 104, with subsections 104' for the frame-sync signal and 104'' for the address, is connectable to the coder 103 through a normally blocked gate 105 adapted to be unblocked by a signal Q from a control unit 106 which also periodically emits a zero signal $S_z$ to trigger the generator 104. A second signal generator 107, with subsections 107' for the subframe-sync signal and 107'' for the data to be transmitted, is periodically triggered — and thereby operatively connected to coder 103 — by an actuating signal $S_t$ from control unit 106. Signal $S_t$ is generated during the data subframe allocated to the respective station, i.e., in this instance during the sixth data subframe $sf_6$.

The control unit 106 responds to various signals emanating from decoder 102, i.e., to frame-sync pulses $P_f$ derived from the frame-sync code $S_f$ of FIG. 5(III), (III), subframe-sync pulses $P_{sf}$ derived from the subframe-sync code $S_{sf}$ of FIG. 5(II), (II), and a failure signal $I_f$ emitted by an integrator 108 which monitors the regular generation of frame-sync signals by receiving the corresponding pulses $P_f$ and comparing their cumulative level with a reference potential so as to generate the failure signal $I_f$ whenever the pulse $P_f$ is absent for a certain number of consecutive frame periods T. With decoder 102 in continuous operation, pulses $P_f$ and $P_{sf}$ also come into existence when the corresponding sync codes are emitted by station $ST_6$ itself.

Figure 3:
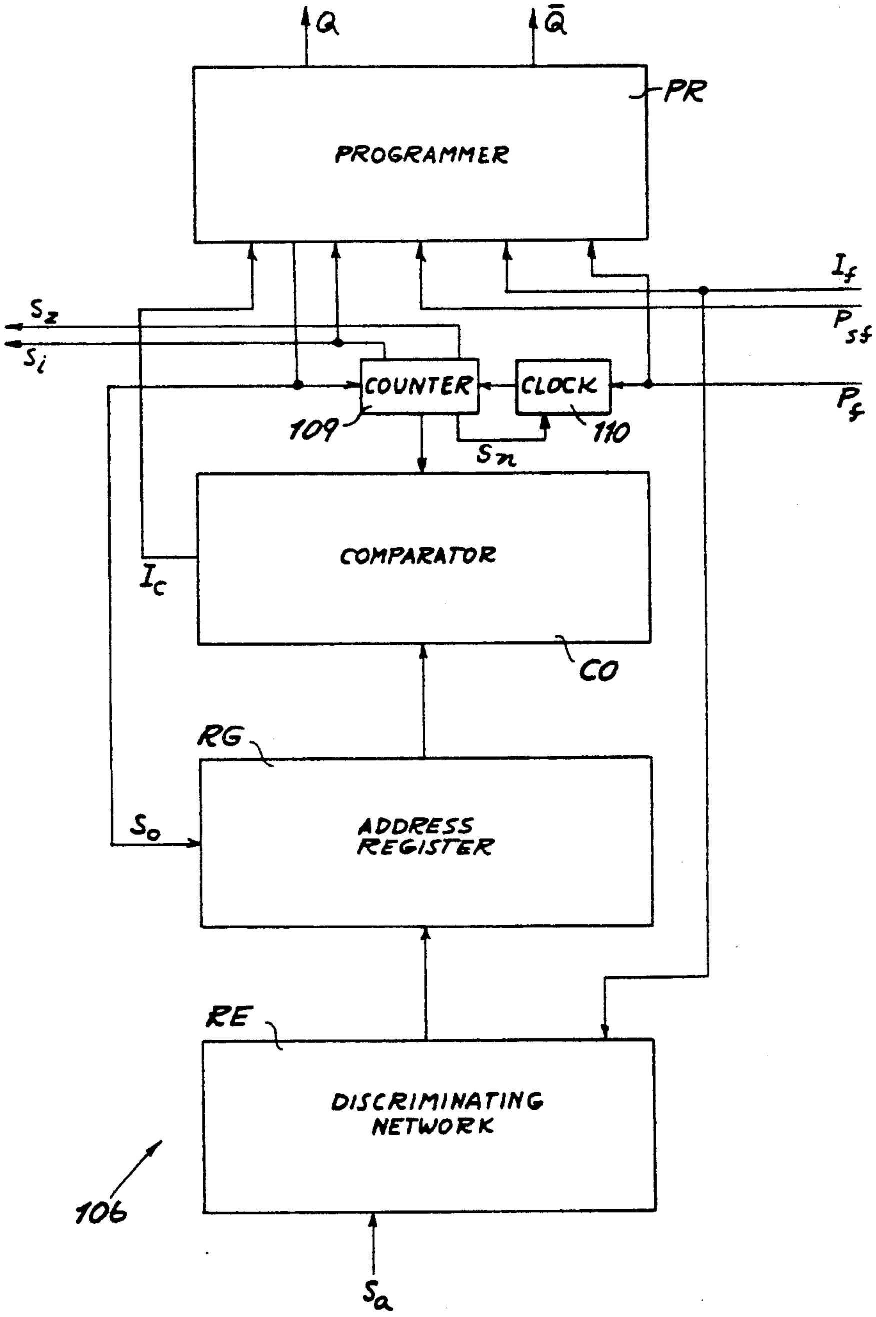
FIG. 3 is a more detailed block diagram of a control unit shown in FIG. 2.

Reference will now be made to FIG. 3 which shows the basic components of control unit 106. These components include a logic network RE which receives the address $S_a$ of the currently operative reference station from decoder 102 and transmits it to an address register RG. The purpose of network RE is to insure positive identification of the reference station by suppressing transient and fortuitous changes in the incoming signal $S_a$. Thus, network RE changes the contents of register RG only if a new address iteratively appears in its input, e.g., three consecutive times as determined by a counter not shown, upon the initial activation of station $ST_6$ or upon a switchover to a different reference station. The counter in network RE is reset to zero every time a failure signal $I_f$ is emitted by generator 108 (FIG. 2) to cancel the address previously stored in register RG. Thus, the registration of that address is maintained as long as the transmission of frame-sync pulses continues without major interruptions.

Figure 6:
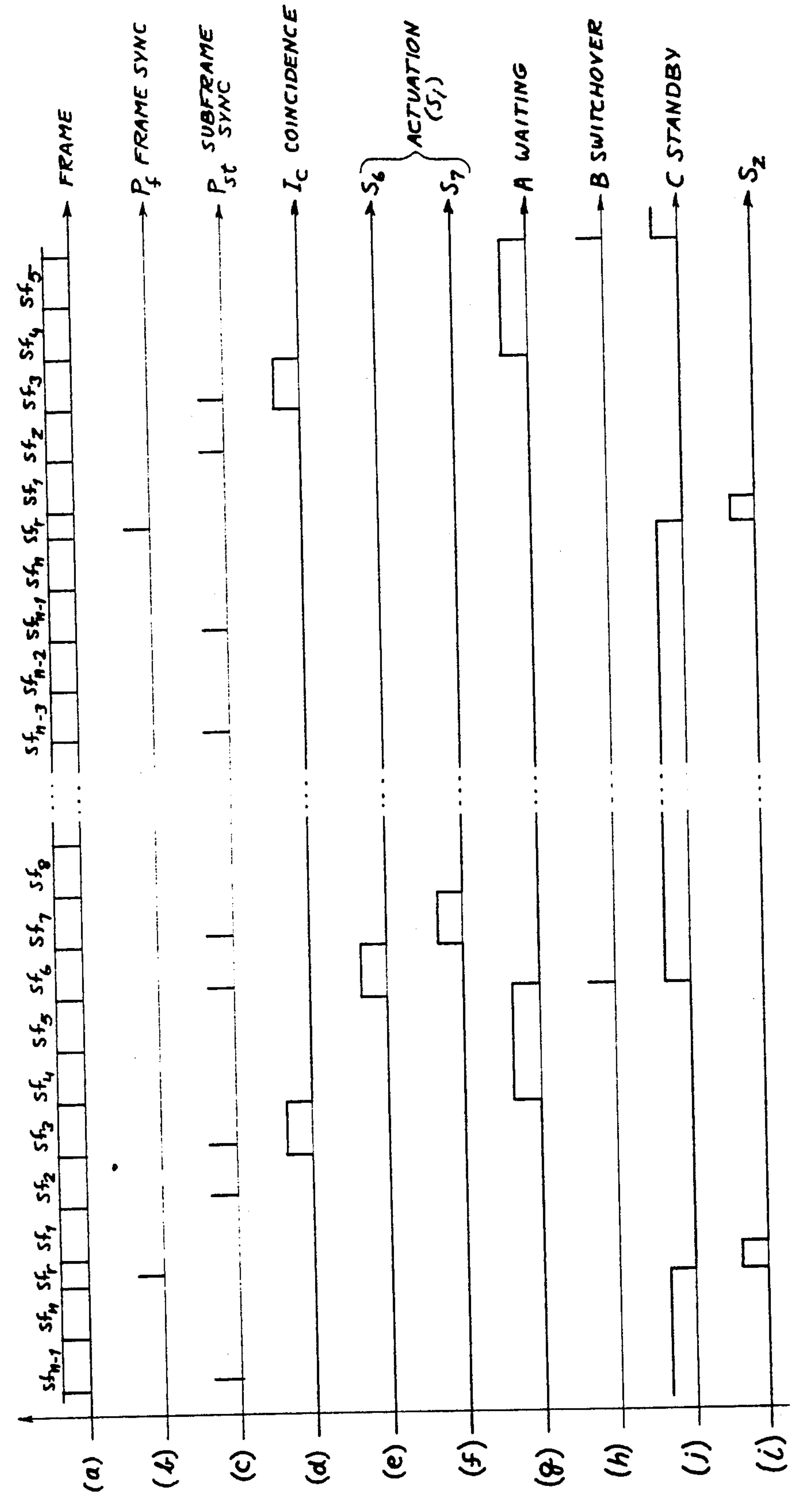
FIG. 6 is a set of graphs relating to the operation of the circuit arrangement illustrated in FIG. 4.

Address register RG has a numerical output which designates the data subframe assigned to the currently operative reference station and which in the assumed case has the value "3."This output is fed to a comparator CO along with the output of a counter 109 which is stepped by a clock circuit 110 in the rhythm of the data subframes, i.e., with a pulse spacing equal to the time $T_2$ of FIG. 5(I). Clock circuit 110 is briefly stopped and restarted by each frame-sync pulse $P_f$ (or, upon temporary absence of the sync pulse, by a feedback signal $S_n$ from counter 109 after the $n^{th}$ step) to establish the reference subframe $sf_r$ at the beginning of each new frame period; see FIG. 6, graphs (*a*) and (*b*). When the count of the data subframes matches the numerical value fed in from register RG, comparator CO emits a coincidence signal $I_c$ as shown in FIG. 6(*d*). The actuating signal $S_t$, FIG. 6(*e*), is generated by the counter 109 after a predetermined number of steps (here six) to mark the allocated data subframe (here $sf_6$).

The actuating signal $S_t$ from counter 109, the coincidence signal $I_c$ from comparator CO, the sync pulses $P_f$, $P_{sf}$ from decoder 102 (FIG. 2) and the failure signal $I_f$ from integrator 108 are delivered to a programmer PR which generates either the switchover signal Q or its complement $\bar{Q}$ respectively unblocking or blocking the gate 105. Signal $S_t$ is also transmitted to the generator 107 of FIG. 2; counter 109, upon returning tO its zero position after the $n^{th}$ step, emits the signal $S_z$ which triggers the generator 104 at the beginning of a reference subframe $sf_r$, see FIG. 6(*j*).

Figure 4:
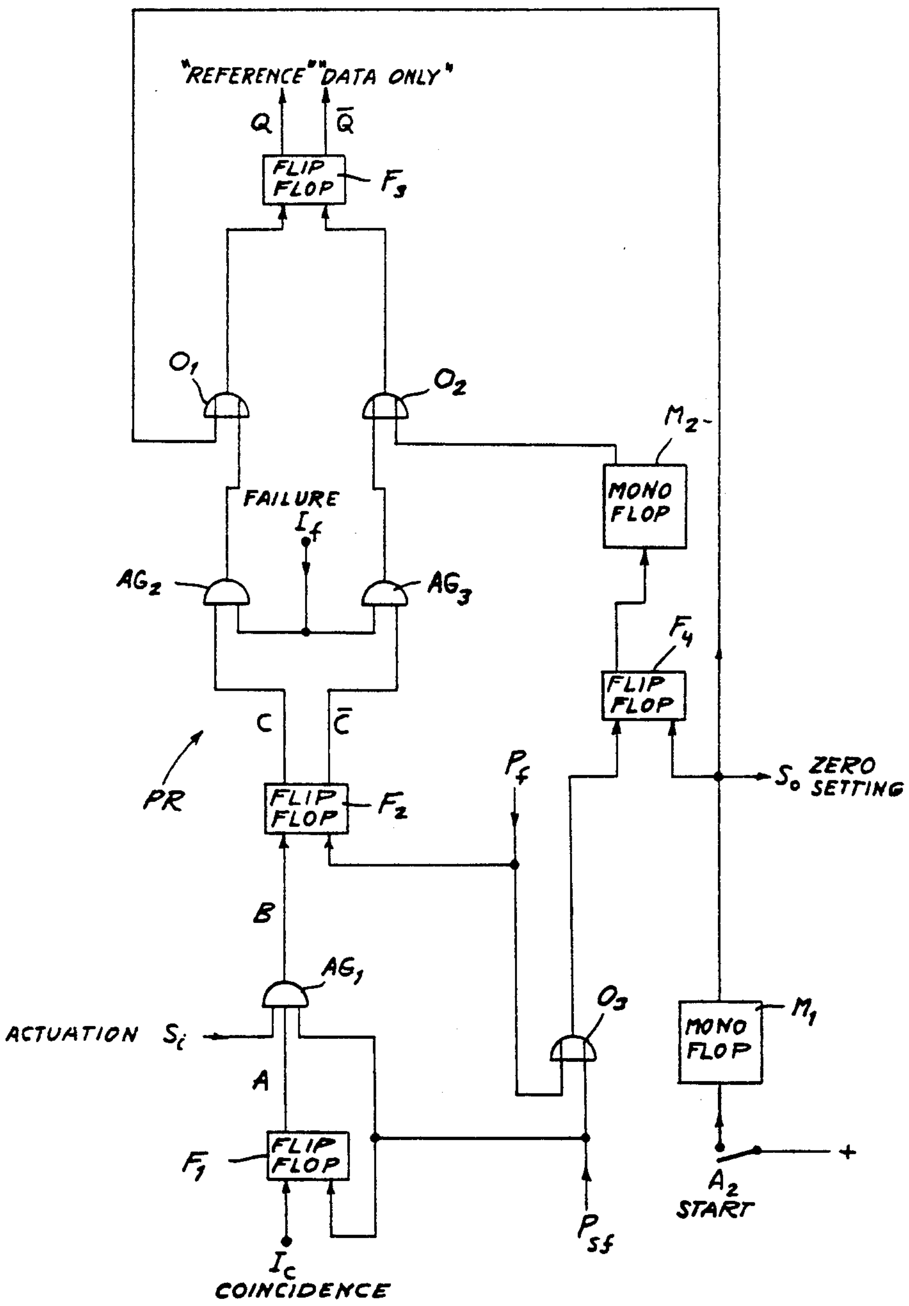
FIG. 4 is a circuit diagram of a component of the control unit shown in FIG. 3.

In FIG. 4 we have shown details of the programmer PR. This programmer comprises three cascaded flip-flops $F_1$, $F_2$ and $F_3$, the latter being normally reset to generate the "data only" signal signal $\bar{Q}$ so as to keep the gate 105 (FIG. 2) blocked. Flip-flop $F_1$ is set, once per frame during normal operation, by the trailing edge of the coincidence signal $I_c$ emanating from comparator CO; this produces an output signal A which, as illustrated in graph (g) of FIG. 6, comes into existence with the data subframe immediately following the one allocated to the current reference station, here specifically with subframe $SF_4$. The presence of this internal signal A marks a waiting phase which terminates with the resetting of flip-flop $F_1$ by the next subframe-sync pulse $P_{sf}$. In the situation assumed by way of example, as illustrated in FIG. 6(*c*), such subframe-sync pulses are generated only at the beginning of the second, third, sixth, seventh, $(n-3)^{th}$ and $(n-1)^{th}$ subframes, the remaining subframes being assigned to inactive stations or to stations already having access to the satellite in at least one additional subframe. In the latter instance, a blocking circuit (not shown) controlled by the counter 109 prevents the resetting of flip-flop $F_1$ by any but the first subframe-sync pulse originating at a given station in the course of a frame.

Signal A and pulse $P_{sf}$ are fed to respective inputs of an AND gate $AG_1$ having a third input connected to receive the actuating signal $S_t$ from counter 109. The coincidence of signal $S_t$, output A and pulse $P_{sf}$ in the input of AND gate $AG_1$, just before the trailing edge of that short pulse resets the flip-flop $F_1$, gives rise to a switchover pulse B setting the flip-flop $F_2$ to generate an output signal C, FIG. 6(*i*), which establishes a standby condition. The pulse B is produced only in station $ST_6$ which, in the case here assumed by way of example, generates the first subframe-sync pulse $P_{sf}$ following the establishment of the waiting phase by the signal A. In station $ST_7$, in which the actuating signal $S_t$ occurs only after the waiting phase has been terminated by the subframe-sync signal from station $ST_6$, flip-flop $F_2$ is not set and thus no standby condition is established; see FIG. 6, graphs (*e*) and (*f*).

If, at the end of the frame in progress, a frame-sync pulse $P_f$ arrives in response to a corresponding signal from reference station $ST_3$, flip-flop $F_2$ is reset to end the standby condition by discontinuing the internal signal C. This signal is applied to one of two inputs of another AND gate $AG_2$ while its complement $\bar{C}$, from the reset output of flip-flop $F_3$, reaches an input of a similar AND gate $AG_3$. The remaining input of each AND gate $AG_2$, $AG_3$ is energized by the failure signal $I_f$ from integrator 108 if the frame-synchronizing code is not received for the aforementioned number of frame periods. Thus, if station $ST_2$ drops out, AND gate $AG_2$ conducts and energizes the setting input of flip-flop $F_3$ through an OR gate $O_1$, thereby giving rise to the reference signal Q with resulting unblocking of gate 105.

In station $ST_7$, on the other hand, the occurrence of failure signal $I_f$ has no such effect inasmuch as AND gate $AG_3$ rather than $AG_2$ conducts in the presence of signal $\bar{C}$ instead of C. The output of AND gate $AG_3$ energizes the resetting input of flip-flop $F_3$ through an OR gate $O_2$.

A manual switch $A_s$ such as a pushbutton may briefly be closed to activate a previously idle station by applying a start pulse to a monostable circuit or monoflop $M_1$ generating a zero-setting pulse $S_o$ which, as shown in FIG. 3, is applied to counter 109 and register RG to clear same. Pulse $S_o$ is also fed to the setting input of a further flip-flop $F_4$ and, via OR gate $O_1$, to the setting input of flip-flop $F_3$. If, at this time, synchronizing signals are generated by another station or stations of the system, flip-flop $F_4$ is promptly reset through the first frame-sync pulse $P_f$ or subframe-sync pulse $P_{sf}$ reaching its resetting input by way of an OR gate $O_3$. This switching of flip-flop $F_4$ trips a one-shot pulse generator, in the form of another monoflop $M_2$, which via OR gate $O_2$ resets the flip-flop $F_3$ to restore the normal operating condition with generation of the "data only" signal $\bar{Q}$ in lieu of "reference" signal Q. Since the identification network RE of any other station does not respond to a single address code emitted from station $ST_6$ during the brief existence of signal Q, the operation of the system is not impaired by this procedure.

If, on the other hand, station $ST_6$ is the first to become active, or if no other station emits frame-sync signals, the address register RG will be empty and the waiting phase (signal A) starts with count "O," i.e., at the reference subframe established by the apperance of signal Q. In the absence of a prior subframe-sync signal from another station, the occurrence of pulse $P_{sf}$ in the sixth subframe $sf_6$ (counting from the reference subframe $sf_r$) again establishes the standby condition and, for want of a frame-sync pulse $P_{sf}$ owing to the resetting of flip-flop $F_3$ by monoflop $M_2$, brings about the reference condition by again setting that flip-flop through AND gate $AG_2$. Station $ST_6$ thereupon periodically sends out the frame-sync code $S_f$, thereby preventing the monitoring circuit 108 from generating the failure signal $I_f$ so that flip-flop $F_3$ remains unswitchable until the station goes off the air or suffers a malfunction in its signal generator 104.

We claim:

1. In a telecommunication system having a plurality of intercommunicating stations each provided with transceiver means for sending out and receiving information, each of said stations being identified by an individual address code and having allocated to it at least one subframe in a predetermined series of subframes constituting a recurrent frame of coded signals, the improvement wherein each of said stations comprises:

first signal-generating means connectable to said transceiver means for sending out a frame-synchronizing signal together with the address code of the station during a first subframe of any frame;

second signal-generating means connectable to said transceiver means for sending out a subframe-synchronizing signal together with transmittable data during a subframe allocated to the station;

timing means triggerable by an incoming frame-synchronizing signal for establishing a reference subframe followed by a succession of data subframes and for emitting an actuating signal during said allocated subframe operatively connecting said second signal-generating means to said transceiver means;

register means connected to said transceiver means for storing an address code accompanying an incoming frame-synchronizing code and for identifying a data subframe associated with the stored address code;

comparison means connected to said register means and said timing means for generating a coincidence signal upon the occurrence of said associated data subframe;

programming means responsive to said coincidence signal for establishing a waiting phase and to a subframe-synchronizing signal for terminating said waiting phase, said programming means being further responsive to an occurrence of said actuating signal in said waiting phase for establishing a standby condition and to a frame-synchronizing signal for terminating said standby condition; and monitoring means connected to said transceiver means and responsive to nonreception of the frame-synchronizing signal for generating a failure signal to operate said programming means for converting said standby condition into a reference condition with operative connection of said first signal-generating means to said transceiver means.

2. The improvement defined in claim 1 wherein said programming means comprises a first flip-flop settable by said coincidence signal and resettable by said subframe-synchronizing signal, a second flip-flop settable by said actuating signal in the presence of an output of the set first flip-flop and resettable by said frame-synchronizing signal, and a third flip-flop settable and resettable by a failure signal from said monitoring means in the set and reset states, respectively, of said second flip-flop.

3. The improvement defined in claim 2 wherein said switch means further comprises a first AND gate and a second AND gate with inputs connected to be energized from said second flip-flop in the set and the reset state thereof, respectively, each of said AND gates having a further input connected to receive said failure signal.

4. The improvement defined in claim 2, further comprising a source of start pulses actuatable to set said third flip-flop in response to any synchronizing signal, said circuitry including switch means connected to be activated by a start pulse and deactivated by a synchronizing signal resetting said third flip-flop.

5. The improvement defined in claim 4 wherein said switch means comprises a fourth flip-flop settable by said start pulses and resettable by both frame-synchronizing and subframe-synchronizing signals, and a one-shot pulse generator connected to be actuated by said fourth flip-flop upon a resetting thereof to reset said third flip-flop.

6. The improvement defined in claim 1 wherein said monitoring means comprises storage means for measuring a predetermined number of frame periods lacking a frame-synchronizing signal prior to generating a failure signal.

7. The improvement defined in claim 1 wherein said register means is provided with discriminating circuitry for preventing the storage of spurious address changes occurring only in isolated frames.

8. A method of operating a telecommunication system wherein a multiplicity of stations intercommunicate in different data subframes respectively allocated to said stations in a recurrent frame of coded signals, comprising the steps of:

assigning to each of said stations an address establishing a predetermined order of succession;

activating at least one of said stations for data transmission in its allocated data subframe;

periodically emitting from the first activated station a frame-synchronizing signal together with its address, thereby identifying same as a temporary reference station;

emitting from each active station including the temporary reference station, in the data subframe respectively allocated thereto, a subframe-synchronizing signal indicative of the active condition of the station;

monitoring at each active station the emission of subframe-synchronizing and frame-synchronizing signals and deriving the identity of the temporary reference station from the address accompanying each frame-synchronizing signal;

determining from said identity at each active station the occurrence of the respectively allocated data subframe within each frame;

establishing at each active station a waiting phase immediately following the data subframe allocated to the temporary reference station and terminating said waiting phase upon the reception of a subframe-synchronizing signal from any other station prior to the occurrence of said respectively allocated data subframe;

establishing, at the first active station following the temporary reference station in said order of succession, a standby condition in response to nonreception to a subframe-synchronizing signal from any other station during said waiting phase; and initiating, at the last-mentioned station, the periodic emission of the address thereof together with a frame-synchronizing signal upon prolonged nonreception of such signal in said standby condition, thereby identifying said last-mentioned station as a new temporary reference station.

9. A method as defined in claim 8 wherein said stations intercommunicate via satellite.

* * * * *

PO-1050
(5/69)

UNITED STATES PATENT OFFICE
CERTIFICATE OF CORRECTION

Patent No. 3,761,814 Dated 25 September 1973

Inventor(s) Gabriele BERNASCONI et al

It is certified that error appears in the above-identified patent and that said Letters Patent are hereby corrected as shown below:

In the heading, line [30], change the number of the priority date to read -- 33133-A/70 -- .

Signed and sealed this 4th day of June 1974.

(SEAL)
Attest:

EDWARD M.FLETCHER,JR.
Attesting Officer

C. MARSHALL DANN
Commissioner of Patents